(12) United States Patent
Chuang

(10) Patent No.: US 7,748,150 B2
(45) Date of Patent: Jul. 6, 2010

(54) BICYCLE-USED IDENTIFICATION DEVICE

(76) Inventor: Louis Chuang, 8$^{th}$ Floor-4, No. 20, Ta Lon Road, Taichung (TW)

( * ) Notice: Subject to any disclaimer, the term of this patent is extended or adjusted under 35 U.S.C. 154(b) by 395 days.

(21) Appl. No.: 11/749,195

(22) Filed: May 16, 2007

(65) Prior Publication Data

US 2007/0277415 A1 Dec. 6, 2007

(30) Foreign Application Priority Data

May 30, 2006 (TW) .............................. 95119167 A

(51) Int. Cl.
*B62K 21/00* (2006.01)
*G09F 3/02* (2006.01)
(52) U.S. Cl. ...................... 40/590; 280/288.4; 280/279
(58) Field of Classification Search ................... 40/631, 40/661.11, 626, 727, 772, 781, 606.09, 584, 40/606.03, 606.08, 201, 911; 280/288.4, 280/279
See application file for complete search history.

(56) References Cited

U.S. PATENT DOCUMENTS

| | | | | |
|---|---|---|---|---|
| 311,782 A * | 2/1885 | Porter | ..................... | 40/661.11 |
| 583,863 A * | 6/1897 | Alley | ............................... | 40/5 |
| 2,011,850 A * | 8/1935 | Clarke | ......................... | 40/615 |
| 2,247,499 A * | 7/1941 | Hutchison, Jr. | ............. | 411/378 |
| 3,023,027 A * | 2/1962 | Franciscus | ............... | 280/288.4 |
| 3,186,665 A * | 6/1965 | Cole et al. | ................ | 248/475.1 |
| 3,383,784 A * | 5/1968 | Bien | ............................ | 40/628 |
| 3,812,757 A * | 5/1974 | Reiland | ......................... | 411/5 |
| 4,037,855 A * | 7/1977 | Smith | .......................... | 280/276 |
| 4,068,858 A * | 1/1978 | Harrison et al. | ........... | 280/288.4 |
| 5,092,797 A * | 3/1992 | Cole et al. | ................... | 439/783 |
| 5,369,900 A * | 12/1994 | Garrison | ....................... | 40/631 |
| 5,381,618 A * | 1/1995 | Singleton | ...................... | 40/202 |
| 5,802,754 A * | 9/1998 | Watanabe | ..................... | 40/630 |
| 2004/0148826 A1* | 8/2004 | MacNeil | ....................... | 40/209 |
| 2006/0226632 A1* | 10/2006 | Chuang | .................... | 280/288.4 |

FOREIGN PATENT DOCUMENTS

GB 2342629 A * 4/2000

* cited by examiner

*Primary Examiner*—Cassandra Davis
(74) *Attorney, Agent, or Firm*—Alan Kamrath; Kamrath & Associates PA

(57) ABSTRACT

A bicycle is provided with an identification device. The identification device includes a base, an identity plate and two fasteners. The base is formed on the bicycle. The fasteners are used to attach the identity plate to the base so that the identity plate cannot be removed from the base.

9 Claims, 7 Drawing Sheets

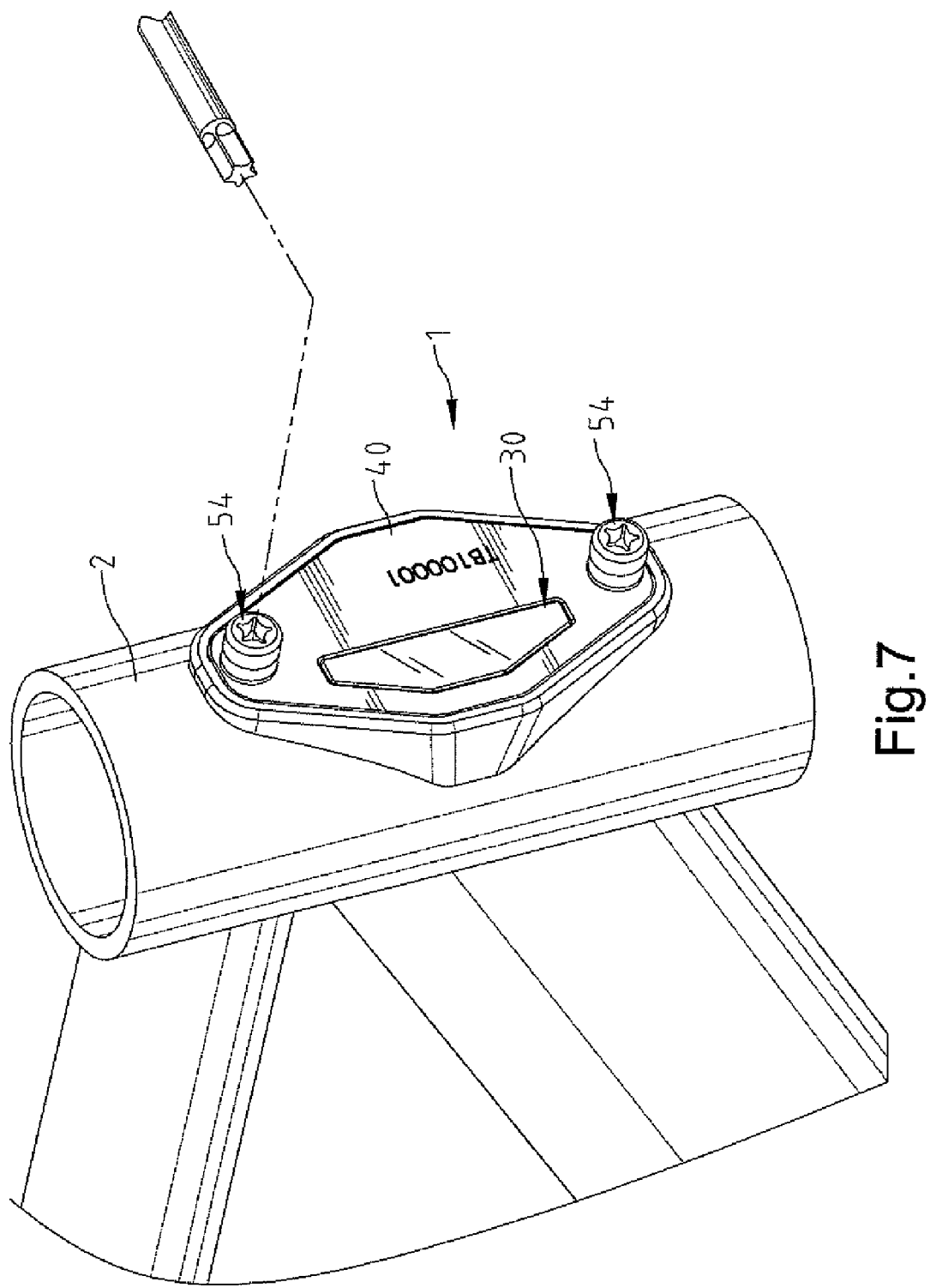

BICYCLE-USED IDENTIFICATION DEVICE

BACKGROUND OF INVENTION

1. Field of Invention

The present invention relates to a bicycle-used identification device.

2. Related Prior Art

There are various bicycles such as racing bicycles, mountain bicycles or general-purposed bicycles. Some are inexpensive and available for ordinary people. Some are expensive and only available for rich people or professional riders. Some expensive bicycles are almost as expensive as some mini sedans. Compared with cars, bicycles are light, and expensive bicycles are particularly light. Such light and expensive bicycles are vulnerable of theft. Furthermore, riders sometimes ride bicycles of one model and color in a same trip. For example, black is sometimes the only color for a model. It is difficult for these riders to distinguish their bicycles.

The present invention is therefore intended to obviate or at least alleviate the problems encountered in the prior art.

SUMMARY OF INVENTION

According to the present invention, a bicycle is provided with an identification device. The identification device includes a base, an identity plate and two fasteners. The base is formed on the bicycle. The fasteners are used to attach the identity plate to the base so that the identity plate cannot be removed from the base.

An advantage of the identification device according to the present invention is its ability to suppress a thief's desire to steal a bicycle.

Another advantage of the identification device according to the present invention is that it enables a rider to distinguish his or her bicycle from other bicycles of a same model and color.

Another advantage of the identification device according to the present invention is its security by using the fasteners.

Another advantage of the identification device according to the present invention is that it enables the police to consult a maker to identify an owner after his or her bicycle is lost and found by using the serial number.

Other advantages, objectives and features of the present invention will become apparent from the following description referring to the attached drawings.

BRIEF DESCRIPTION OF DRAWINGS

The present invention will be described via detailed illustration of three embodiments referring to the drawings.

FIG. 7 is a perspective view of an identification device according to the third embodiment of the present invention.

DETAILED DESCRIPTION OF EMBODIMENTS

Figure 1:
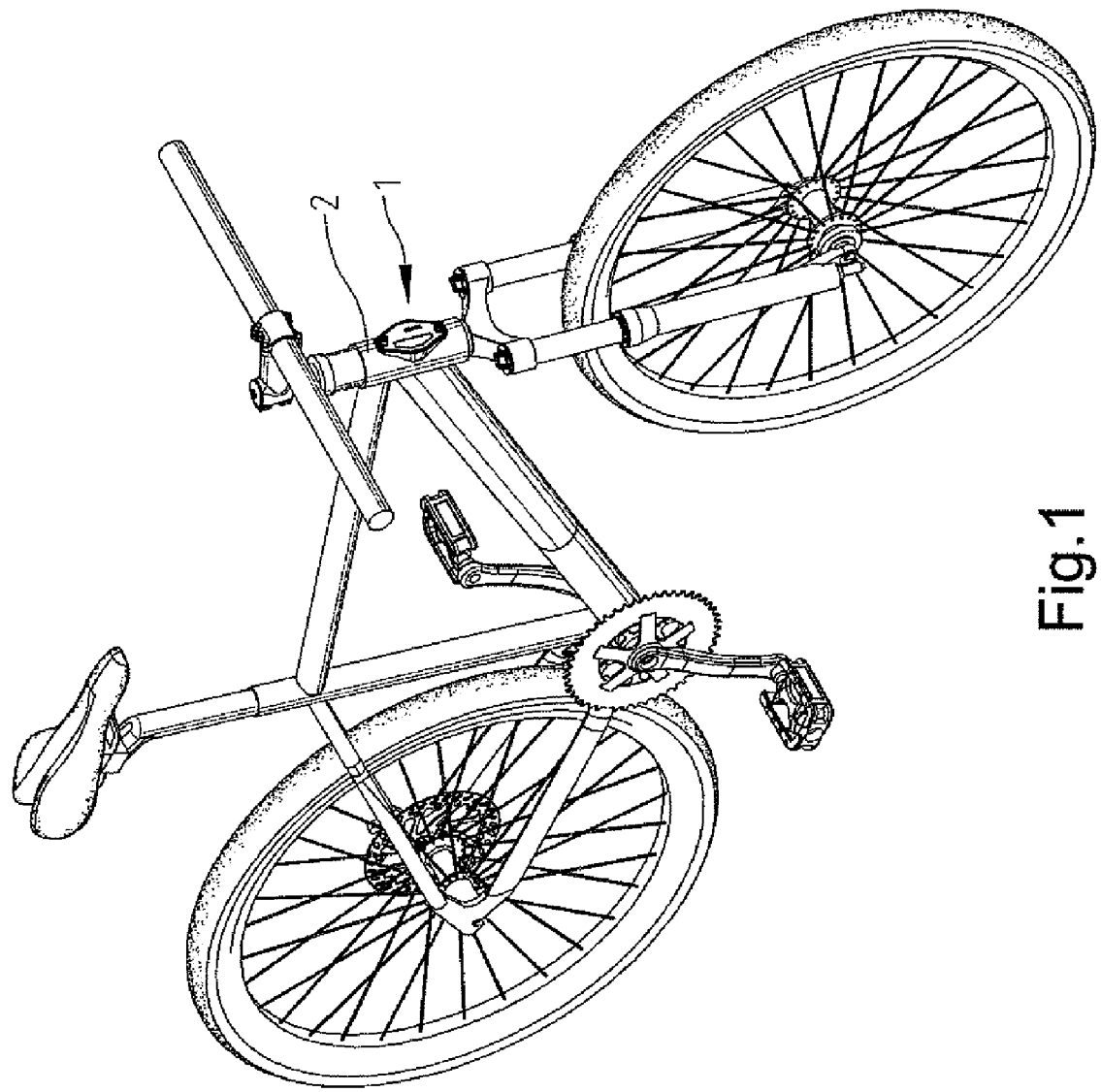
FIG. 1 is a perspective view of a bicycle equipped with an identification device according to the first embodiment of the present invention.

Referring to FIG. 1, a bicycle 2 is equipped with an identification device 1 according to a first embodiment of the present invention. The identification device 1 is preferably intended for an expensive bicycle with a frame made of carbon fibers or a composite material.

Figure 2:
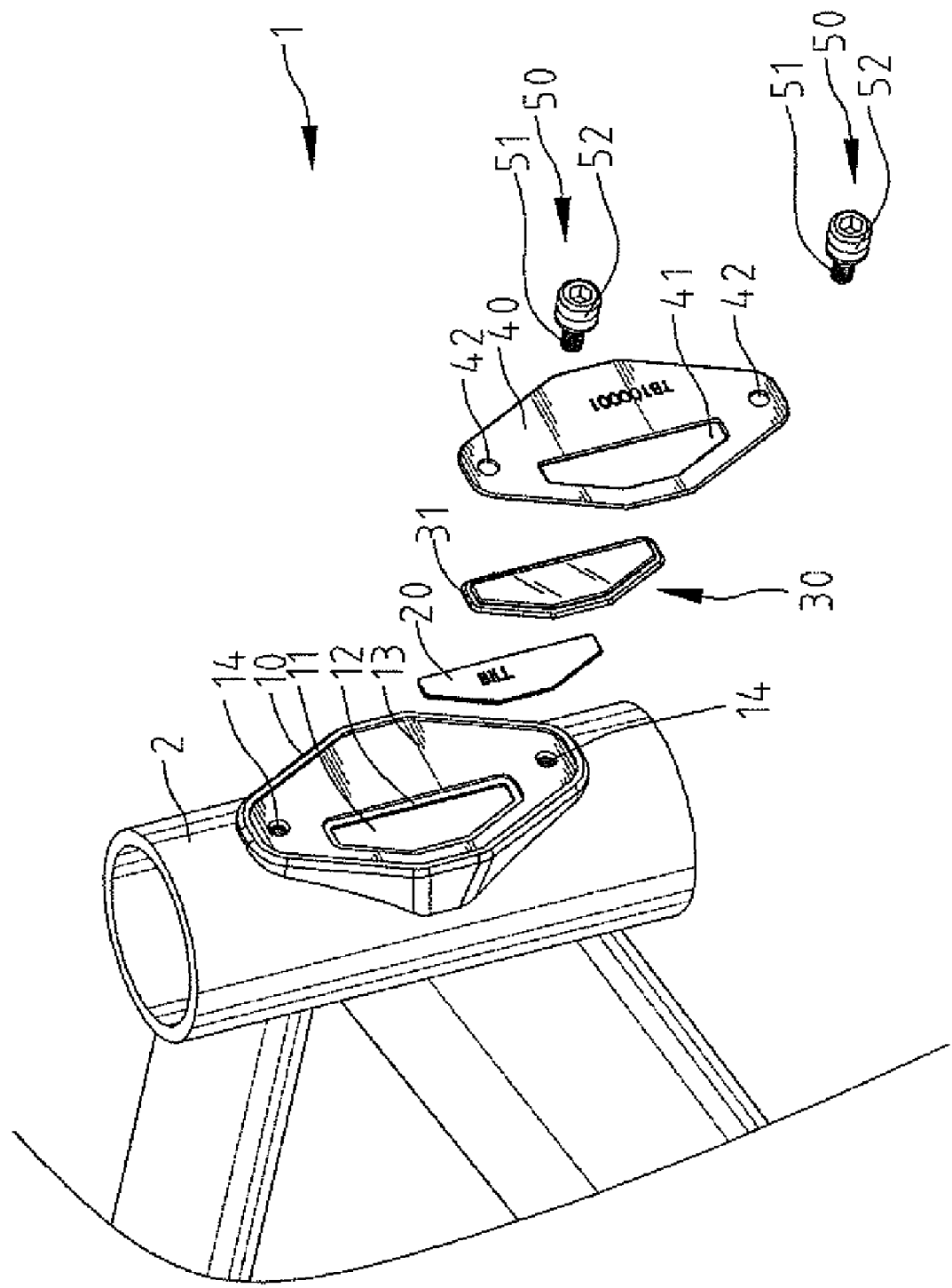
FIG. 2 is an exploded view of the identification device of FIG. 1.

Referring to FIG. 2, the identification device 1 includes a base 10 formed on a head tube of the bicycle 2, an identity plate 20 located in the base 10, a lens 30 located over the identity plate 20, a panel 40 located around the lens 30 and two fasteners 50 for attaching the panel 40 to the base 10.

The base 10 includes a cavity 13 defined therein, a cavity 12 defined in the floor of the cavity 13, a cavity 11 defined in the floor of the cavity 12 and two screw holes 14 defined in the floor of the cavity 13.

Figure 5:
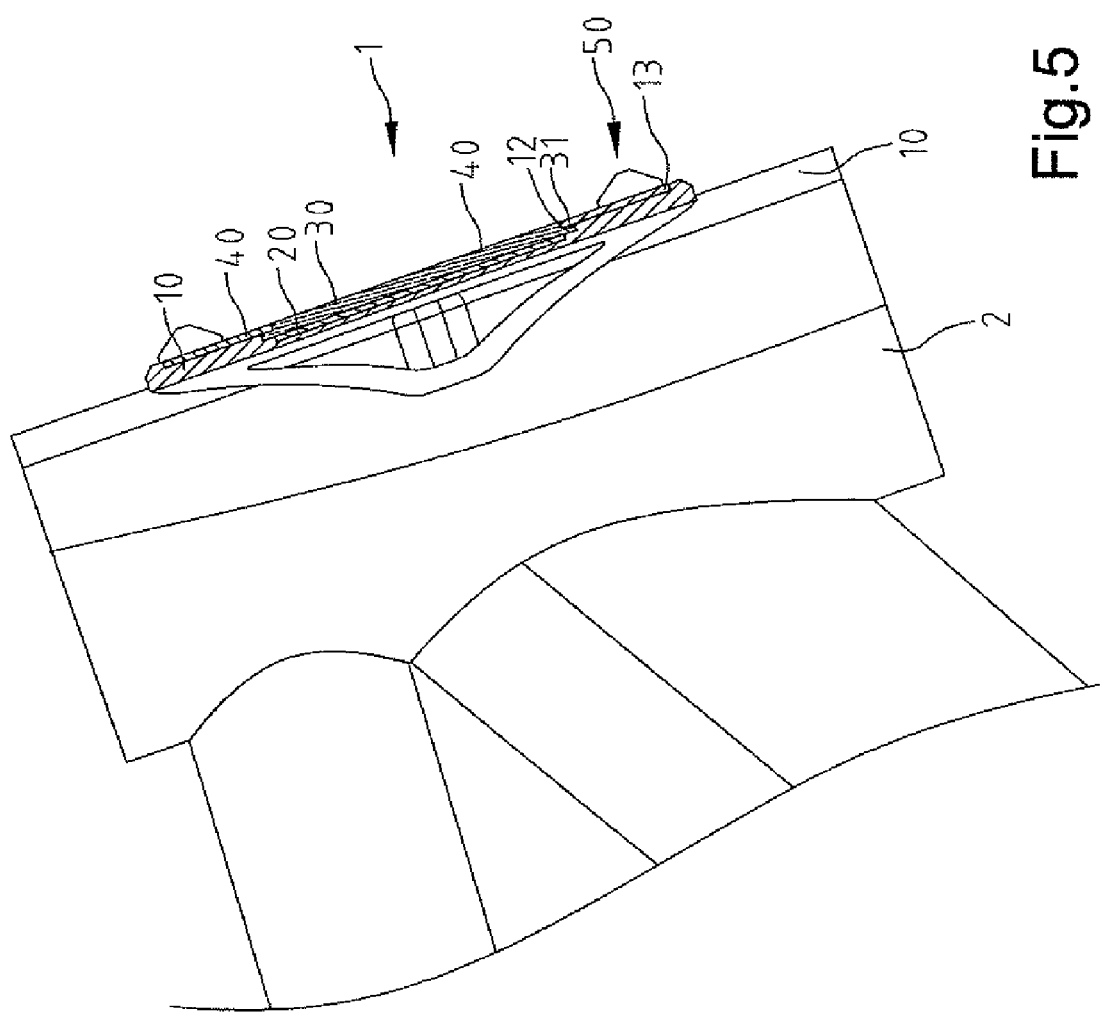
FIG. 5 is a cross-sectional view of the identification device in another position than shown in FIG. 4.

Referring to FIG. 5, the identity plate 20 is located in the cavity 11. The area of the identity plate 20 is as large as or marginally smaller than that of the cavity 11. The thickness of the identity plate 20 is as large as the depth of the cavity 11. An owner's name and any other information can be provided on or in the identity plate 20 by writing, typing, printing and imprinting for example.

The lens 30 includes an edge 31. The thickness of the edge 31 is smaller than the remaining portion of the lens 30. The edge 31 is located in the cavity 12.

The panel 40 includes a window 41 and two apertures 42 all defined therein. The panel 40 is located in the cavity 13. The edge 31 is pressed against the panel 40. The lens 30 is located in the window 41. The area of the panel 40 is as large as or marginally smaller than that of the cavity 13. The area of the lens 30 except the edge 31 is as large as or marginally smaller than that of the window 41. A serial number is imprinted in the panel 40 by a manufacturer. The serial number enables the police to consult a maker to identify an owner after his or her bicycle is lost and found.

Figure 3:
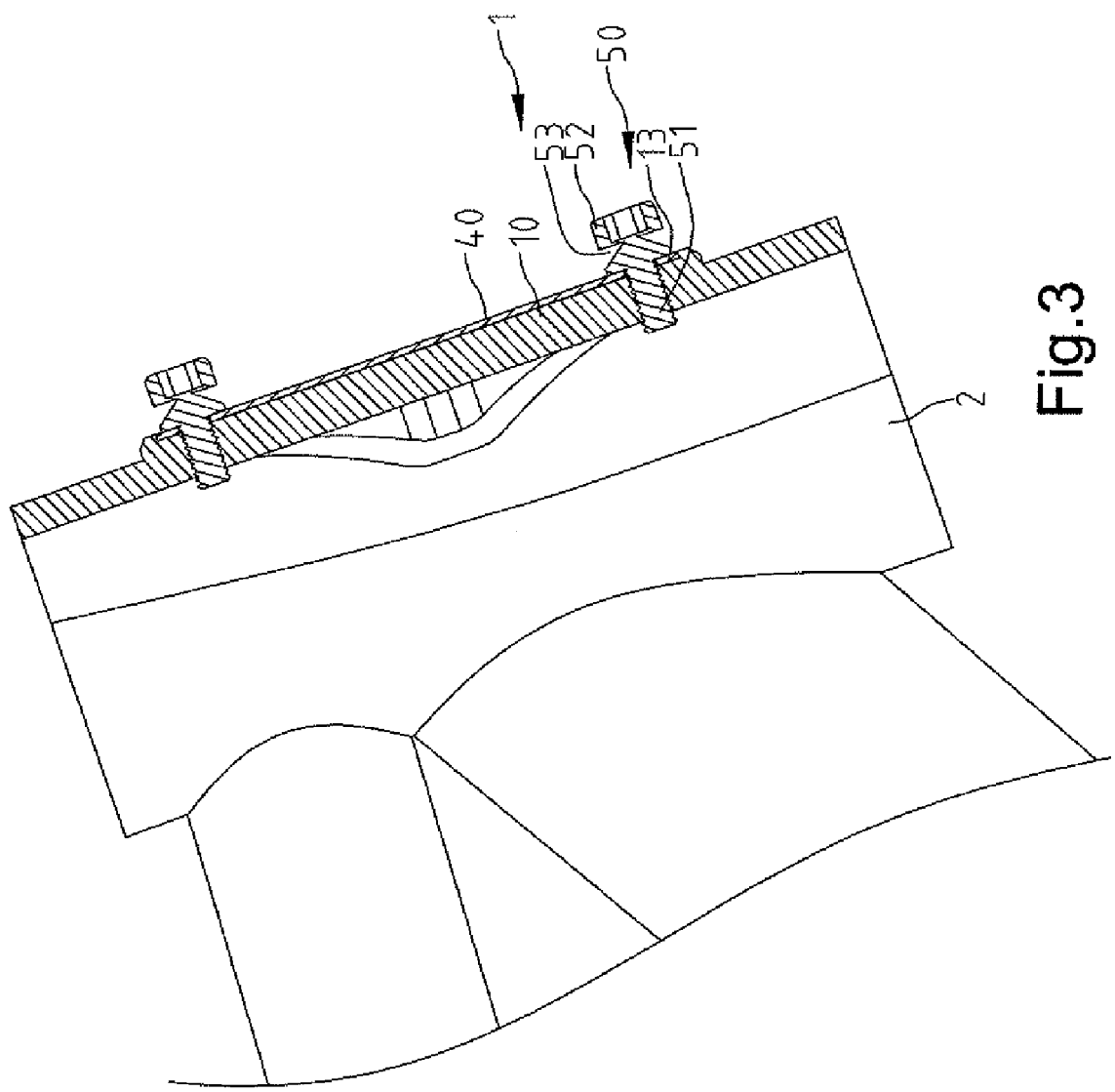
FIG. 3 is a cross-sectional view of the identification device shown in FIG. 1.

Referring to FIGS. 2 and 3, each of the fasteners 50 includes a threaded body 51 and a head 52 formed on the threaded body 51. The head 52 of each of the fasteners 50 includes an annular groove 53 defined therein and a recess defined therein for receiving an Allen key 3. The heads 52 of the fasteners 50 are driven by the Allen key 3 so that the threaded bodies 51 of the fasteners 50 are driven into the screw holes 14 through the apertures 42.

Figure 4:
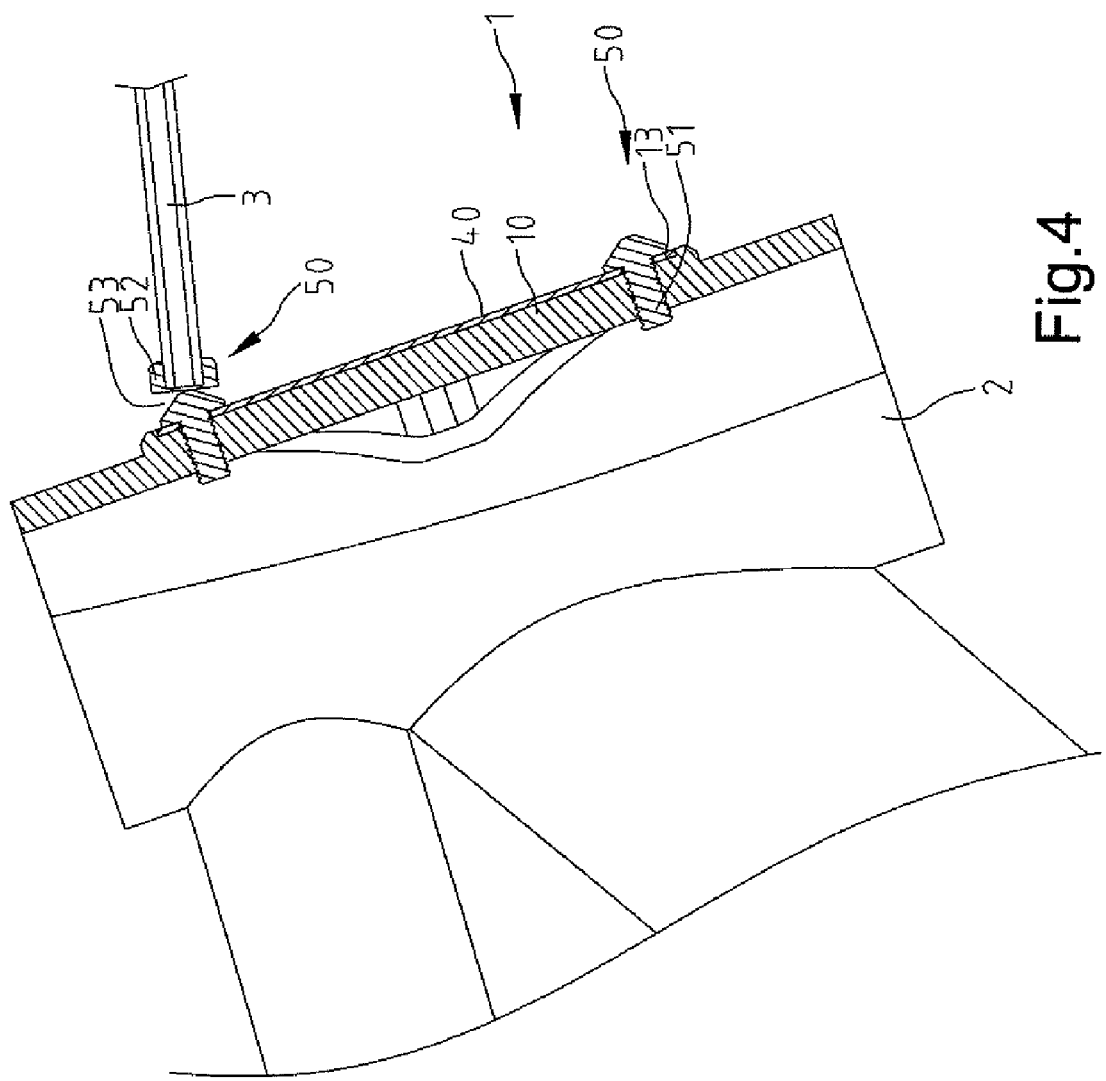
FIG. 4 is a cross-sectional view of the identification device in another position than shown in FIG. 3.

Referring to FIG. 4, the heads 52 of the fasteners 50 can be bent and broken from the annular grooves 53.

Referring to FIG. 5, the remaining portion of each of the fasteners 50 cannot be driven. Therefore, the panel 40 is firmly kept on the base 10 by the fasteners 50.

Figure 6:
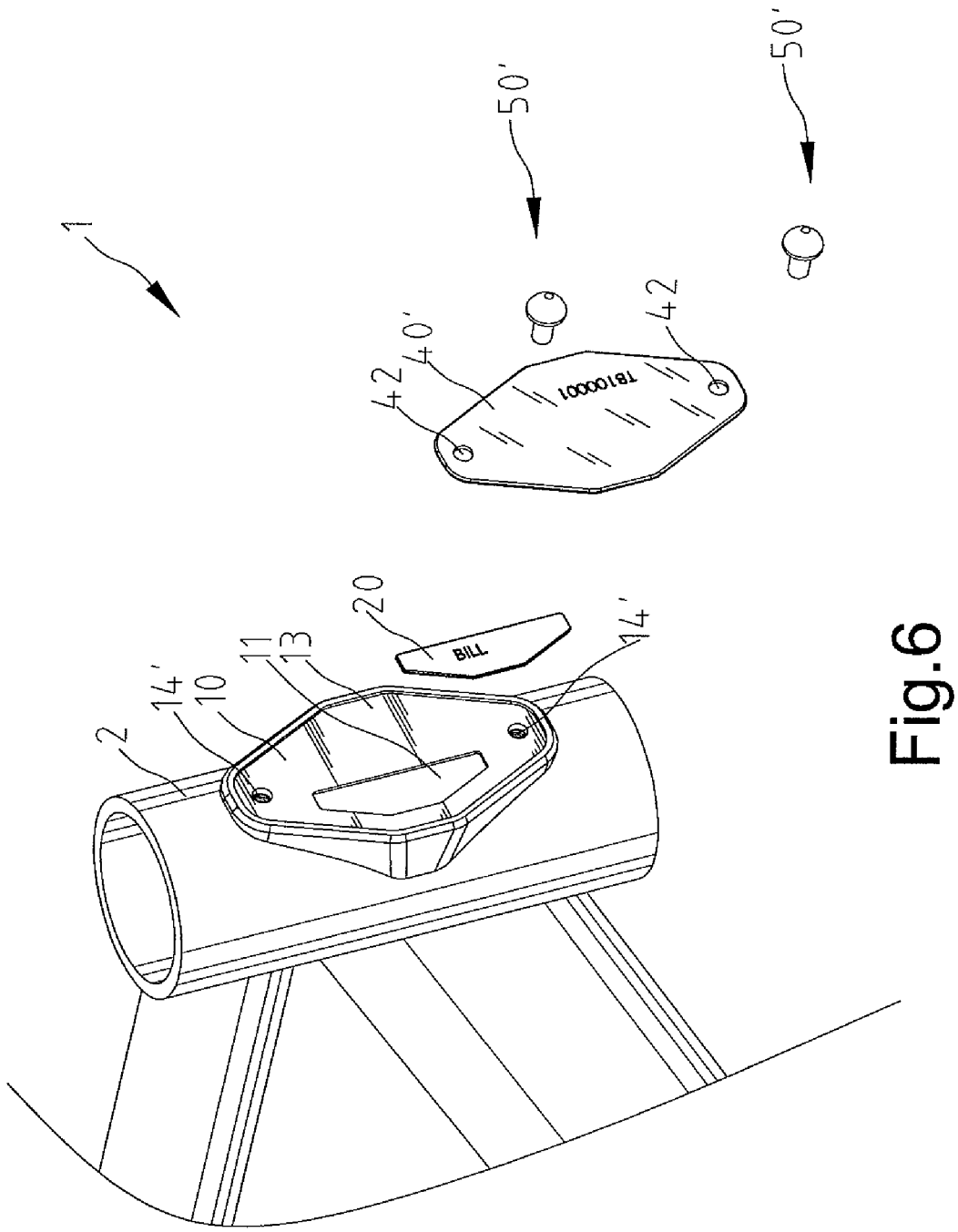
FIG. 6 is an exploded view of an identification device according to the second embodiment of the present invention.

Referring to FIG. 6, there is an identification device according to a second embodiment of the present invention. The second embodiment is like the first embodiment except several things. Firstly, the cavity 11 is defined in the floor of the cavity 13 as the cavity 12 is omitted. Secondly, there are two simple holes 14' instead of the screw holes 14. Thirdly, the lens 30 is omitted. Fourthly, a transparent panel 40' is used instead of the lens 30 and the panel 40. The transparent panel 40' includes two apertures 42 defined therein. Fifthly, two fasteners 50' are used instead of the fasteners 50. The fasteners 50' are rivets driven into the holes 14' through the apertures 42.

Referring to FIG. 7, there is an identification device according to a third embodiment of the present invention. The third embodiment is like the first embodiment except including threaded bolts 54 instead of the threaded bolts 50.

The identification device according to the present invention exhibits several advantages. Firstly, it suppresses a thief's desire to steal a bicycle. Secondly, it enables a rider to distinguish his or her bicycle from other bicycles of a same model and color. Thirdly, it is secured by using the fasteners. Fourthly, it enables the police to consult a maker to identify an owner after his or her bicycle is lost and found by using the serial number.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A bicycle-used identification device comprising:
   a base formed on a head tube of a bicycle;
   an identity plate;
   two fasteners; and
   a panel covering the identity plate, with the identity plate being observable through the panel, with the identity plate sandwiched between the base and the panel, with the two fasteners extending through the panel and into the base for attaching the identity plate to the base so that the identity plate cannot be removed from the base; and
   wherein the base comprises a lens-receiving cavity defined therein and a plate-receiving cavity defined in the floor of the lens-receiving cavity and receiving the identity plate, with the plate-receiving cavity having a cross section smaller than a cross section of the lens-receiving cavity parallel to the identity plate; and
   wherein the lens-receiving cavity receives a first portion of a lens.

2. The bicycle-used identification device according to claim 1 wherein the panel is a transparent panel.

3. The bicycle-used identification device according to claim 1 wherein the panel comprises a window through which the identity plate is observable.

4. The bicycle-use identification device according to claim 3 wherein the lens fits in the window and extends over the identity plate.

5. The bicycle-used identification device according to claim 4 wherein the lens comprises an edge pressed against the panel.

6. The bicycle-used identification device according to claim 1 wherein each of the two fasteners is a rivet.

7. The bicycle-used identification device according to claim 1 wherein each of the two fasteners is a threaded bolt.

8. The bicycle-used identification device according to claim 7 wherein the base comprises two screw holes defined therein, and each of the two fasteners is operable to drive the threaded body into a related one of the two screw holes.

9. The bicycle-used identification device according to claim 1 wherein the identity plate carries an owner's name.

\* \* \* \* \*